United States Patent
Hsiao et al.

(10) Patent No.: US 7,190,552 B2
(45) Date of Patent: Mar. 13, 2007

(54) MAGNETIC HEAD HAVING A DAMASCENE-FABRICATED WRITE COIL STRUCTURE WITH COIL LAYERS EXTENDING BETWEEN THE POLES FOR REDUCED ELECTRICAL RESISTANCE

(75) Inventors: Wen-chien David Hsiao, San Jose, CA (US); Edward Hin Pong Lee, San Jose, CA (US); Vladimir Nikitin, Cambpell, CA (US); Samuel Weisan Yuan, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/375,160

(22) Filed: Mar. 14, 2006

(65) Prior Publication Data

US 2006/0152849 A1    Jul. 13, 2006

Related U.S. Application Data

(63) Continuation of application No. 10/629,060, filed on Jul. 29, 2003, now Pat. No. 7,079,353.

(51) Int. Cl.
   *G11B 5/17* (2006.01)
(52) U.S. Cl. .................. 360/123; 360/126
(58) Field of Classification Search ............. 360/123, 360/126
   See application file for complete search history.

(56) References Cited

U.S. PATENT DOCUMENTS

| | | |
|---|---|---|
| 5,173,826 A | 12/1992 | Bischoff |
| 5,331,495 A | 7/1994 | Yoshida et al. |
| 6,043,959 A | 3/2000 | Crue, Jr. et al. |
| 6,191,918 B1 | 2/2001 | Clarke et al. |
| 6,377,423 B2 | 4/2002 | Dill et al. |
| 6,396,660 B1 | 5/2002 | Jensen et al. |
| 6,452,742 B1 | 9/2002 | Crue, Jr. et al. |

(Continued)

OTHER PUBLICATIONS

"European Search Report for Application 04017016.9", Jan. 12, 2004.

*Primary Examiner*—A. J. Heinz
(74) *Attorney, Agent, or Firm*—John J. Oskorep, Esq.; Rambod Nador

(57) ABSTRACT

Magnetic heads having write coil structures with reduced electrical resistances for reducing thermal protrusion are disclosed. In one illustrative example, a magnetic head includes a magnetic yoke; a write gap layer formed between upper and lower poles of the magnetic yoke; and a write coil having a plurality of coil layers. Each coil layer of the write coil extends continuously between the upper and the lower poles through a plane defined by the write gap layer. Preferably, the write coil is formed using a damascene process, such that each coil layer is wider than each coil separating layer. Such a structure provides for a relatively large amount of coil materials to be used, which reduces the coil's electrical resistance. This, in turn, reduces the heat generated by the write coils during operation. Further, either one or both of the lower and upper poles may include a horizontally laminated structure of alternating magnetic and non-magnetic dielectric layers to further reduce heating caused by eddy current losses. Since thermal protrusion is reduced, the fly height of magnetic head may be made relatively small with a reduced risk of head-to-disk crashes and disk scratches.

16 Claims, 7 Drawing Sheets

U.S. PATENT DOCUMENTS

| | | |
|---|---|---|
| 6,466,402 B1 | 10/2002 | Crue, Jr. et al. |
| 6,507,455 B1 | 1/2003 | Kikuiki et al. |
| 6,567,239 B1 | 5/2003 | Hasegawa et al. |
| 6,781,790 B1 | 8/2004 | Sasaki |
| 6,927,939 B2 * | 8/2005 | Sasaki et al. ............... 360/126 |
| 7,023,658 B1 * | 4/2006 | Knapp et al. ............... 360/126 |
| 7,035,046 B1 * | 4/2006 | Young et al. ............... 360/126 |
| 2002/0060879 A1 | 5/2002 | Sato |
| 2002/0067571 A1 | 6/2002 | Yoshida et al. |
| 2003/0174435 A1 | 9/2003 | Dinan et al. |

* cited by examiner

MAGNETIC HEAD HAVING A DAMASCENE-FABRICATED WRITE COIL STRUCTURE WITH COIL LAYERS EXTENDING BETWEEN THE POLES FOR REDUCED ELECTRICAL RESISTANCE

CROSS-REFERENCE TO RELATED APPLICATION

This application is a continuation of and claims priority to Application Ser. No. 10/629,060 having a filing date of Jul. 29, 2003, now U.S. Pat. No. 7,079,353 issued on Jul. 18, 2006, which is hereby incorporated by reference herein.

BACKGROUND OF THE INVENTION

1. Field of the Invention

This invention relates generally to magnetic heads in disk drives, and more particularly to magnetic write heads having write coil structures with relatively low electrical resistances to reduce thermal protrusion.

2. Description of the Related Art

A write head is typically combined with a magnetoresistive (MR) or giant magnetoresistive (GMR) read head to form a magnetic recording head, certain elements of which are exposed at an air bearing surface (ABS). The write head comprises first and second pole pieces connected at a back gap that is recessed from the ABS. The first and second pole pieces terminate at the ABS where they define first and second pole tips, respectively. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces magnetic write fields in the first and second pole pieces. A non-magnetic gap layer is sandwiched between the first and second pole tips. Write fields of the first and second pole tips at the ABS "fringe" across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR or GMR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

A GMR read head includes a GMR sensor which manifests the GMR effect. In the GMR sensor, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g., nickel-iron, cobalt, or nickel-iron-cobalt) separated by a layer of nonmagnetic material (e.g., copper) are generally referred to as spin valve (SV) sensors manifesting the SV effect. Recorded data can be read from a magnetic medium because the external magnetic field from the recorded magnetic medium (the signal field) causes a change in direction of magnetization in the free layer, which in turn causes a change in resistance of the SV sensor and a corresponding change in the sensed current or voltage. A GMR head is typically associated with a design in which the second shield layer and first pole piece are not a common layer. These pieces are separated by a non-magnetic material, such as alumina, or a metal that can be deposited using physical vapor deposition, RF sputtering, or electroplating techniques, for example.

One or more heads may be employed in a magnetic disk drive for reading and writing information on circular tracks of a rotating disk. A magnetic recording head is mounted on a slider that is carried on a suspension. The suspension is mounted to an actuator which places the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (i.e. its fly height) from the surface of the disk. Fly heights are typically around 5–20 nanometers (nm) in today's disk drives.

It is generally desirable to minimize the fly height of a magnetic head. If the fly height is too large, it could adversely affect the performance of the read and write head. Unfortunately, any protrusion of metal layers at the ABS will make these layers dangerously close to the disk, especially in disk drives with low fly heights. This could result in head-to-disk crashes or disk scratches.

"Temperature-induced protrusion" (T-PTR) refers generally to the phenomenon where magnetic head materials physically and outwardly protrude from the ABS at elevated temperatures due to the differences in the coefficients of thermal expansion of the various layers which form the head. "Write-induced protrusion" (W-PTR) refers to protrusion due to heating of the magnetic head during the writing process. There are two contributors to W-PTR: (1) Joule heating produced in the write head coils; and (2) yoke core losses. Joule heating and yoke core losses are both induced with AC write current. W-PTR is dominated by the temperature gradient in the head structure, with the highest temperature regions being near the write coils and the yoke, and substrate material at ambient temperature.

Accordingly, what is needed is an improved magnetic head that provides a reduced thermal protrusion so that head-to-disk crashes and/or disk scratches can be avoided.

SUMMARY

Magnetic heads having write coil structures with reduced electrical resistances for reducing thermal protrusion are described herein. In one illustrative embodiment, a magnetic head includes a magnetic yoke; a write gap layer formed between upper and lower poles of the magnetic yoke; and a write coil having a plurality of coil layers. Each coil layer extends continuously between the upper and the lower poles through a plane defined by the write gap layer. Preferably, the write coil is formed using a damascene process, such that each coil layer is relatively wider than each coil separating layer.

Such a structure provides for a relatively large amount of coil materials to be used which reduces the coil's electrical resistance. This, in turn, reduces the heat generated by the write coil during operation. Further, either one or both of the lower and upper poles may include a horizontally laminated structure of alternating magnetic and non-magnetic dielectric layers to further reduce heating caused by eddy current losses.

Advantageously, a magnetic head with a reduced thermal protrusion is provided. Accordingly, the fly height of the magnetic head may be made relatively small with a reduced danger of head-to-disk crashes and disk scratches.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and magnetic head as seen in plane V—V of FIG. 2, where the magnetic head includes a magnetoresistive (MR) read sensor and a non-pedestal type write head;

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
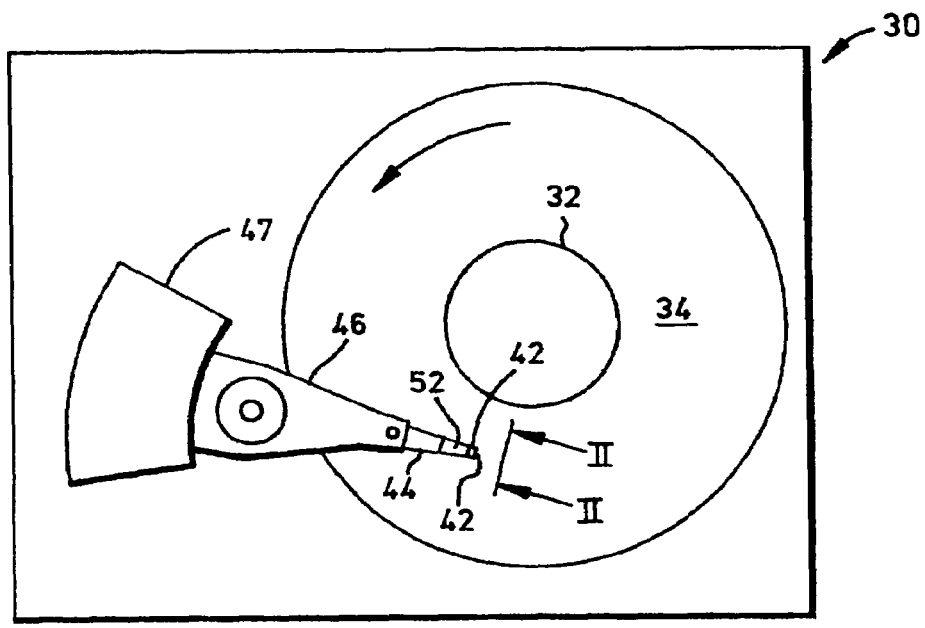
FIG. 1 is a planar view of an exemplary magnetic disk drive.
Figure 2:
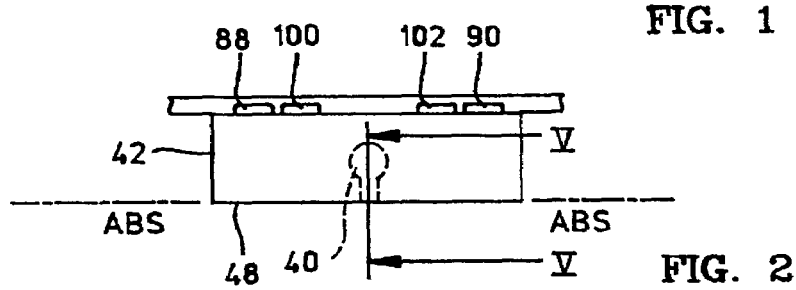
FIG. 2 is an end view of a slider with a magnetic head of the disk drive as seen in plane II—II.
Figure 3:
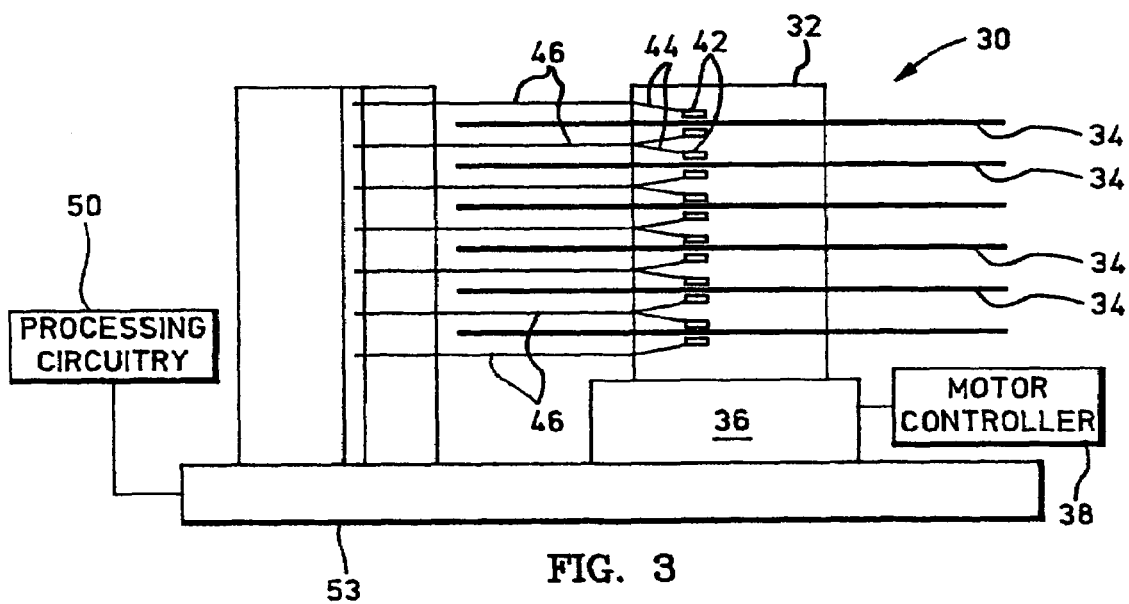
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a conventional magnetic disk drive 30. Disk drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, slider 42 is supported on a thin (typically, 0.05 μm) cushion of air (air bearing) between the disk and an air bearing surface (ABS) 48.

Figure 4:
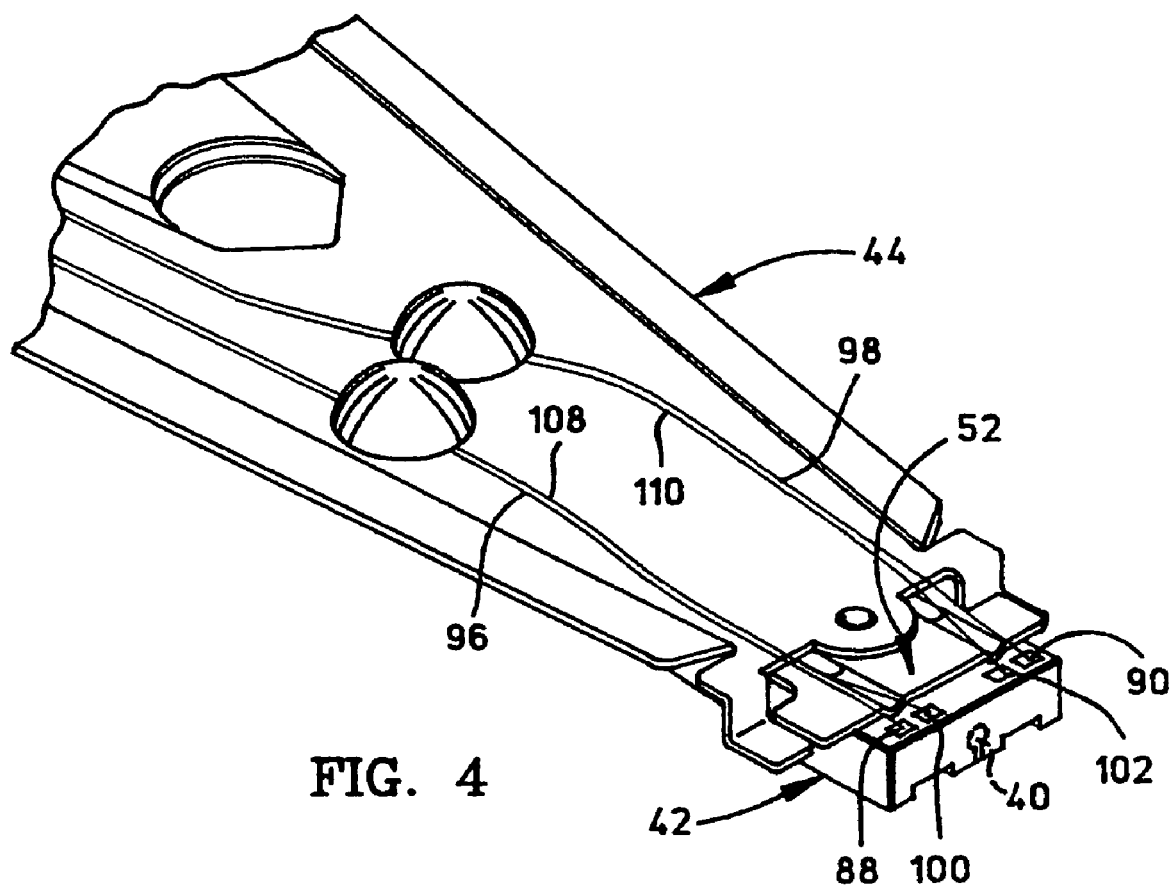
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to suspension 44. All of the above components are supported on a base 53.

FIG. 5 is a side cross-sectional elevation view of a conventional merged magnetoresistive (MR) head 40 as viewed in plane V—V of FIG. 2. Magnetic head 40 has a write head portion 54 ("non-pedestal type") and a read head portion 56. The read head portion includes an MR sensor 58. MR sensor 58 is sandwiched between first and second gap layers 60 and 62 that are, in turn, sandwiched between first and second shield layers 64 and 66. In response to external magnetic fields, the resistance of MR sensor 58 changes. A sense current conducted through MR sensor 58 causes these resistance changes to be manifested as potential changes, which are processed by the processing circuitry 50 shown in FIG. 3.

Figure 6:
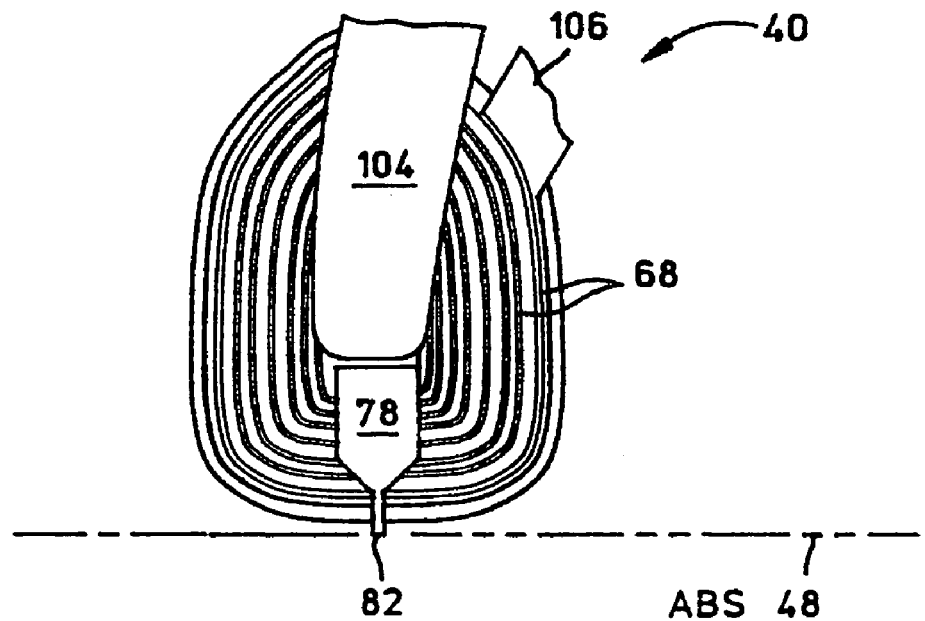
FIG. 6 is a top view of the second pole piece and coil layer, a portion of which is shown in FIG. 5, with all insulation material removed.
Figure 7:
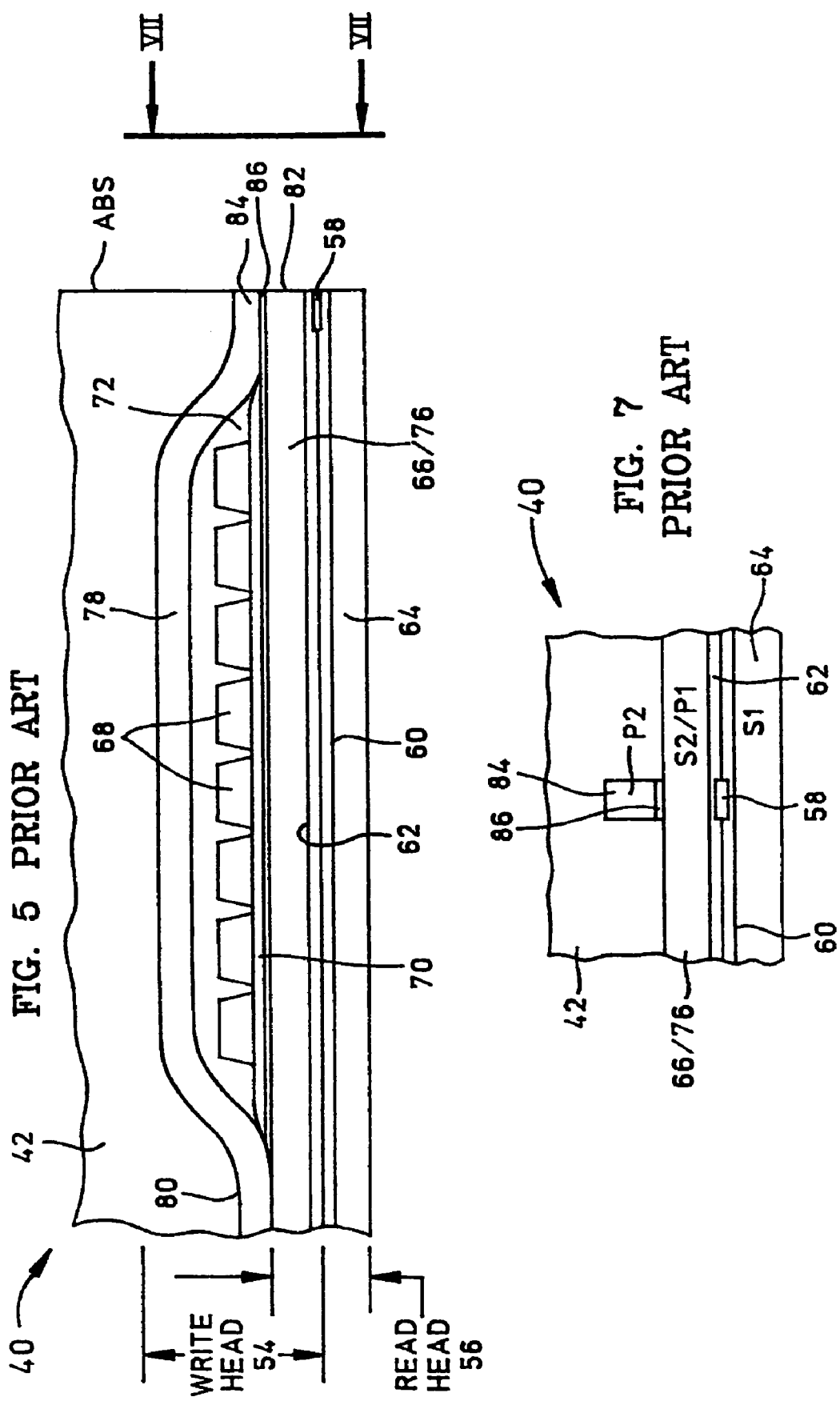
FIG. 7 is a partial ABS view of the slider taken along plane VII—VII of FIG. 5 to show the read and write elements of the magnetic head.

Write head portion 54 of the head includes a coil layer 68 sandwiched between first and second insulation layers 70 and 72. First and second insulation layers 70 and 72 are referred to as an "insulation stack". Coil layer 68 and first and second insulation layers 70 and 72 are sandwiched between first and second pole pieces 76 and 78. First and second pole pieces 76 and 78 are magnetically coupled at a back gap 80, and have first and second pole tips 82 and 84 that are separated by a non-magnetic gap layer 86 at the ABS. Note that coil layer 68 is contained completely above non-magnetic gap layer 86 under and within second pole piece 78. As shown in FIGS. 2 and 4, first and second solder connections 88 and 90 connect leads (not shown) from MR sensor 58 to leads 96 and 98 on suspension 44; third and fourth solder connections 100 and 102 connect leads 104 and 106 from write coil 68 (see FIG. 6) to leads 108 and 110 on suspension 44.

Figure 8:
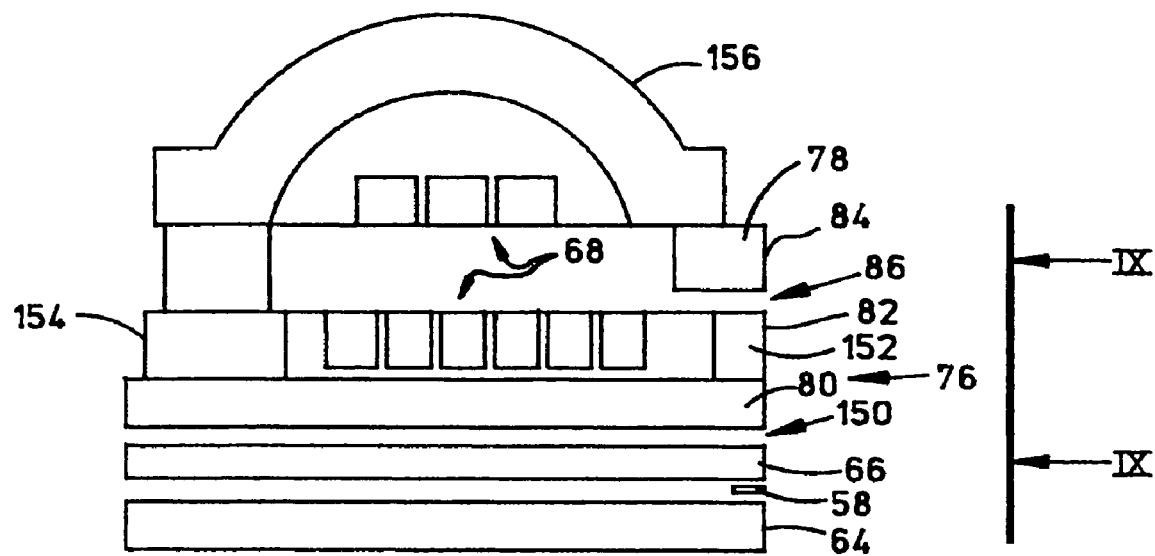
FIG. 8 is a partial elevation view of the slider and magnetic head as seen in plane V—V of FIG. 2, where the magnetic head includes an MR or giant magnetoresistive (GMR) read sensor and a pedestal-type write head.
Figure 9:
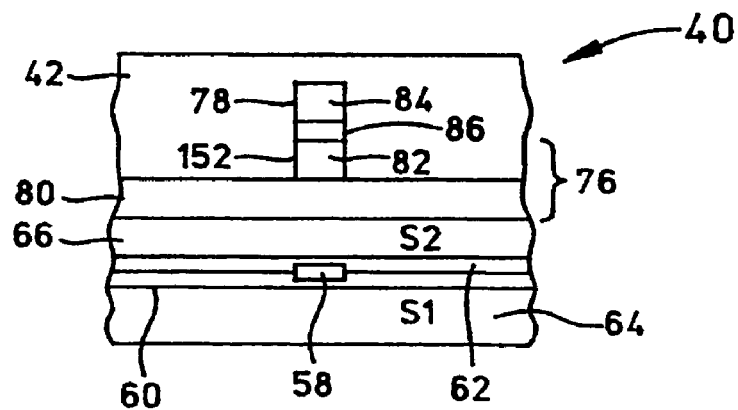
FIG. 9 is a partial ABS view of the slider taken along plane IX—IX of FIG. 8 to show the read and write elements of the magnetic head of FIG. 8.

FIG. 8 is a partial cross-sectional view of another conventional slider and magnetic head ("pedestal type") as viewed in plane V—V of FIG. 2, where the magnetic head may include an MR or a GMR sensor. FIG. 9 is a partial ABS view of the slider taken along plane IX—IX of FIG. 8 to show read and write elements of this magnetic head. Although many components in this magnetic head are the same as those in FIG. 5, some differences are apparent. For one, the head in FIG. 8 includes a pedestal-type write head wherein first pole piece 76 includes a first pole piece layer 80 and a plated pedestal 152. Pedestal 152 is formed on first pole piece layer 80 by electroplating and is made of a magnetic material having a high magnetic moment. Non-magnetic gap layer 86 separates pedestal 152 from second pole piece 78. Similar to pedestal 152, a back gap pedestal 154 is formed on first pole piece layer 80 but in the back gap region. A third pole piece 156, which is formed in an arcuate fashion with a front end formed on top of second pole piece 78, serves as a magnetic flux connecting layer.

Conventional write coils 68 are formed within the magnetic head in a different manner than that in FIG. 5. In particular, a first layer of coil turns are formed below non-magnetic gap layer 86 in between pedestals 152 and 154 and a second layer of coil turns are formed above second pole piece 78 within an arcuate spacing formed by third pole piece 156. Other differences from that in FIG. 5 are that shield layer 66 and first pole piece layer 80 are not common layers; they are separate. A non-magnetic separating layer 150 is formed between shield layer 66 and first pole piece layer 80.

Figure 10:
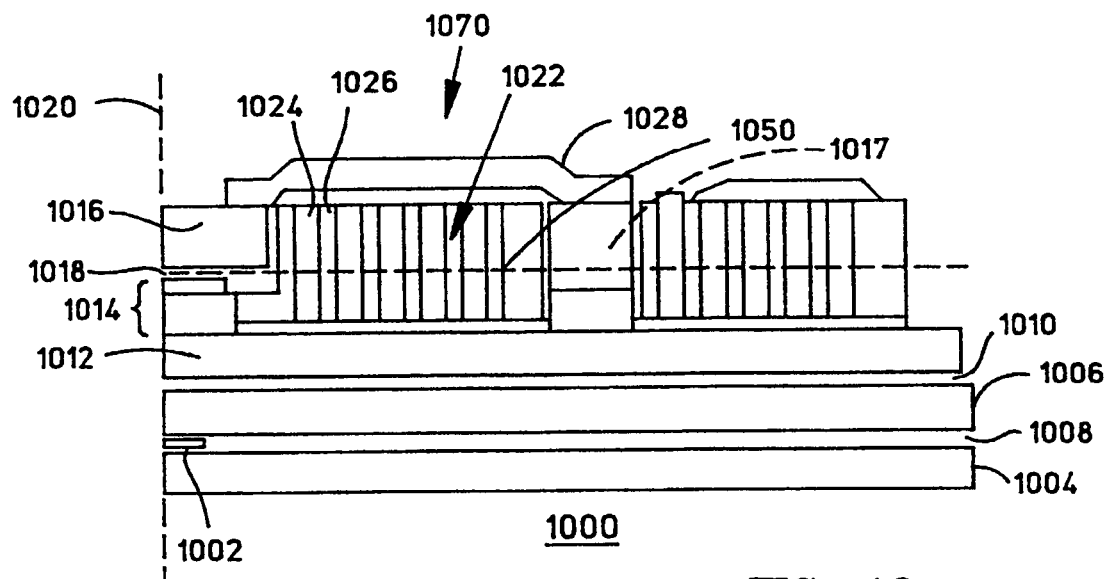
FIG. 10 is a partial elevation view of the slider and magnetic head in cross-section, wherein the magnetic head has a write coil structure of the present invention.

Turning now to FIG. 10, a partial cross-sectional view of a magnetic head 1000 in accordance with one embodiment of the present invention is shown. A read head portion of magnetic head 1000 includes a GMR sensor 1002 sandwiched in between first and second shield layers 1004 and 1006, being protected within surrounding insulator materials 1008. A write head portion of magnetic head 1000 includes a magnetic yoke 1070. Magnetic yoke 1070 is the "horseshoe" or similarly shaped magnetic body which has a lower magnetic pole and an upper magnetic pole. In the embodiment shown, the lower pole of magnetic yoke 1070 includes a first pole piece layer 1012 and a first pedestal structure 1014 and the upper pole of magnetic yoke 1070 includes a second pole piece 1016 and a third pole piece layer 1028 which serves as a magnetic connecting layer to the back gap region.

First pedestal structure 1014 includes at least one pedestal, which may be electroplated over first pole piece layer 1012 just behind an air bearing surface (ABS) 1020 of magnetic head 1000. In the embodiment shown, first pedestal structure 1014 is a double pedestal structure having an upper pedestal with a magnetic moment that is larger than that of the lower pedestal. A non-magnetic write gap layer 1018 separates the pole tips of the lower and the upper poles, being particularly formed between first pedestal structure 1014 and second pole piece 1016. Third pole piece layer 1028 has a front end formed partially on top of second pole piece 1016 and a back end formed on top of one or more magnetic connecting pedestals 1017 in the back gap region. The one or more magnetic connecting pedestals 1017 are formed on top of first pole piece layer 1012. A separation layer 1010 separates second shield layer 1006 from first pole piece layer 1012.

Magnetic yoke 1070 may be made with any suitable magnetic materials, preferably materials having a high magnetic moment, such as various compositions of NiFe alloys, CoFe alloys, or FeAlN, with the inclusion of other common additives or dopants to control its material properties. Write gap layer 1018 and separation layer 1010 may be made of alumina ($Al_2O_3$) or other suitable non-magnetic or dielectric material.

During a write operation, magnetic write flux is produced across write gap layer 1018 across the pole tips of magnetic yoke 1070. Current is driven through write coils 1022 to generate this magnetic write flux, as is conventional. As a result, heat is generated by write coils 1022 and thermally transferred to surrounding magnetic head components. If nothing is done to reduce such heating, thermal expansion will undesirably cause outward protrusion of pole tip materials from the ABS 1020 and therefore the fly height of magnetic head 1000 will have to be increased to avoid head-to-disk mechanical interaction.

According the present invention, write coils 1022 of magnetic head 1000 are formed with a structure that reduces its electrical resistance to thereby reduce heating. This, in turn, reduces or substantially eliminates thermal protrusion at the ABS 1020.

As shown in FIG. 10, write coils 1022 are formed with a plurality of coil layers, such as a write coil layer 1024. Each coil layer 1024 of write coils 1022 is made with an electrically conductive material, such as copper (Cu). Other materials may be suitable, such as gold, silver, or aluminum. In between each coil layer 1024 is a dielectric coil separating layer, such as a coil separating layer 1026, which may be made from hard-baked photoresist, alumina ($Al_2O_3$), silicon-dioxide ($SiO_2$), or other suitable material.

As shown, each coil layer 1024 extends continuously between the lower and upper poles of magnetic yoke 1070. One end of each coil layer 1024 is in close proximity to a top of first pole piece layer 1012, being separated only by a thin insulative layer. The other end of each coil layer 1024 is in close proximity to a bottom of third pole piece layer 1028 and is also separated by an insulator. It is noted that each coil layer 1024 even extends through a plane 1050 defined by write gap layer 1018 (shown as a dashed line in FIG. 10).

As apparent, each coil layer 1024 of write coils 1022 is relatively taller in height than those of conventional write coils. With such construction, write coils 1022 utilize a large amount of electrically conductive materials (e.g. copper) as compared to that used in conventional write coils. An increase in the volume of conductive materials in write coils 1022 leads to a decrease in the electrical resistance of write coils 1022. A reduction in the electrical resistance of write coils 1022 leads to a reduction of heat generation during the write process which, in turn, leads to a reduction in protrusion of magnetic head 1000.

The height (i.e. top to bottom) of each coil layer 1024 may be formed between about 2.0–7.0 micrometers (μm). In the present embodiment, the height of each coil layer 1024 is about 4 μm. It is noted that, although maximum benefits are provided where each coil layer 1024 extends between magnetic yoke 1070 from top to bottom to the fullest practical extent, sufficient benefits may still be achieved with a reduced height of one or both ends of each coil layer 1024. For example, one or both ends of each coil layer 1024 may extend to have a height that is at least half the height of its corresponding pole pedestal/structure.

As shown in FIG. 10, write coils 1022 are provided with six (6) coil turns. However, any suitable number of coil turns may be utilized. For example, write coils 1022 may have between about 1–20 coil turns. For lower resistance coils, the width of coil layer 1024 should be maximized while the width of coil separating layer 1026 should be minimized. Using conventional coil fabrication processes, however, each coil separating layer 1026 can only be formed with a width of between 0.4–1.0 μm (nominally, 0.5 μm for a coil layer of 2 μm in height). On the other hand, using techniques described herein, coil layer 1024 and coil separating layer 1026 are formed such that each coil separating layer 1026 can be made with a width of between about 0.2–0.3 μm (i.e. less than 0.4 μm). This can be done using a damascene process. Note that the "coil pitch" is the summation of coil layer 1024 and coil separating layer 1026.

As previously stated, write coils 1022 have a reduced electrical resistance which is sufficient to reduce thermal protrusion in magnetic head 1000. Conventional write coil structures with 6–7 coil turns typically have resistances between about 4–9 Ohms (i.e. about 0.5–1.5 Ohm per coil turn). Provided with the construction described above, write coils 1022 exhibit a relatively low electrical resistance of about 2–4 Ohms. With 6–7 coil turns, this write coil structure provides about 0.3–0.5 Ohms per coil turn. More generally, write coils 1022 of the present invention may exhibit electrical resistances of about 1–3 Ohms. With 6–7 coil turns, such a write coil structure provides about 0.15–0.5 Ohms per coil turn. Advantageously, the structure can provide less than 0.5 Ohms per coil turn and less than 4 Ohms of total electrical resistance.

Write coils 1022 may be formed in accordance with one of a number of different suitable techniques, conventional or otherwise. Preferably, write coils 1022 are fabricated utilizing a damascene process to achieve a larger coil layer 1024 relative to each coil separating layer 1026. In a damascene process, materials are formed (e.g. electroplated or vacuum-deposited) within openings previously made by etching (e.g. a reactive ion etch or RIE), and excess material is removed by polishing (e.g. a chemical/mechanical polishing or CMP). The use of such a process allows the coil structures and the coil spaces to have a larger aspect ratio (AR) and a smaller coil separating layer 1026 than write coils of the prior art.

Figure 11:
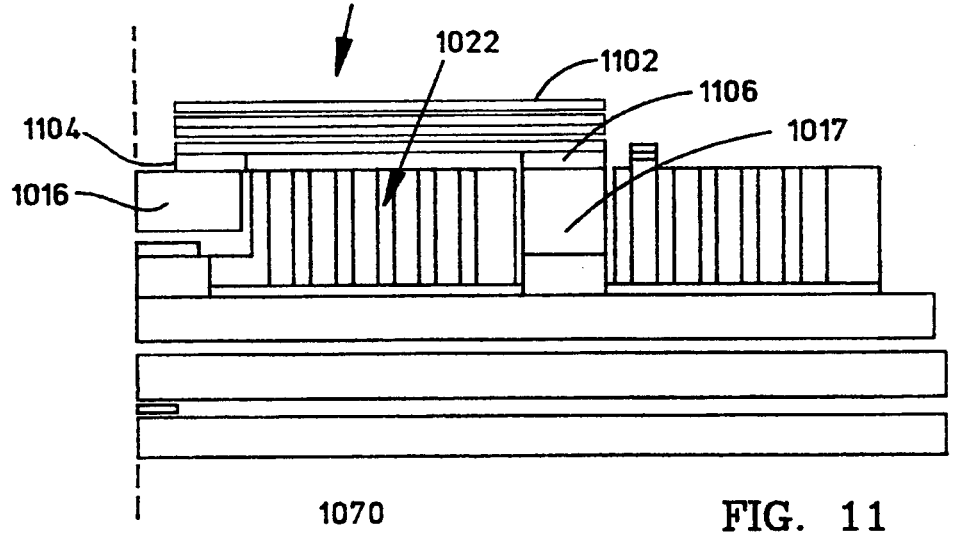
FIG. 11 is the structure shown and described in relation to FIG. 10, except that an upper pole piece of the magnetic yoke is made of alternating layers of magnetic and non-magnetic dielectric material.
Figure 12:
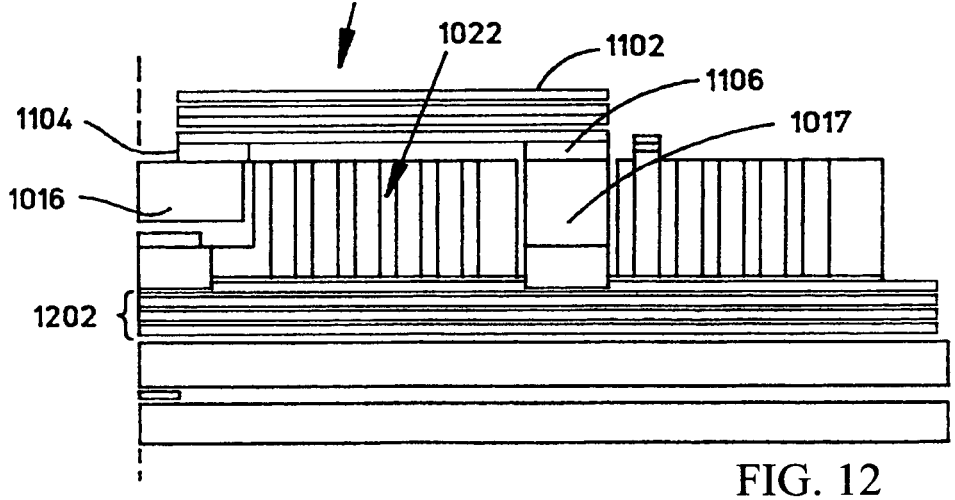
FIG. 12 is the structure shown and described in relation to FIG. 11, except that a lower pole piece of the magnetic yoke is also made of alternating layers of magnetic and non-magnetic dielectric material.

Another source of heat in magnetic head 1000 is generated by eddy current losses during the write operation. To reduce such heating in magnetic head 1000, either one or both of the lower and upper poles includes a horizontally laminated structure of alternating magnetic and non-magnetic dielectric layers. Such a laminated structure helps to "break up" and reduce such eddy current losses. To illustrate, FIG. 11 is the same magnetic head shown in FIG. 10 except that the upper pole of magnetic yoke 1070 is made with a horizontally laminated structure 1102 of alternating magnetic and non-magnetic dielectric layers. Horizontally laminated structure 1102 may be formed on top of connecting magnetic pedestals 1104 and 1106, which are formed on top of pole pieces 1016 and 1017, respectively. FIG. 12 is the same magnetic head shown in FIG. 11 except that the lower pole of magnetic yoke 1070 (i.e. the first pole piece layer) is also made with a horizontally laminated structure 1202 of alternating magnetic and non-magnetic dielectric layers.

In FIGS. 11 and 12, each layer of the horizontally laminated structures 1102 and 1202 may be vacuum-deposited and patterned by ion milling. Each magnetic layer may be made of the same magnetic materials previously described for magnetic yoke 1070, and each non-magnetic dielectric layer may be made of a suitable dielectric or non-magnetic material such as Alumina ($Al_2O_3$) or $SiO_2$. Each magnetic layer may have a thickness of between about 50–2000 Angstroms and each non-magnetic dielectric layer may have a thickness of between about 10–200 Angstroms. In each horizontally-laminated structure, there may be a total of between 4–400 layers of magnetic/non-magnetic dielectric materials.

Thus, the magnetic head described above includes a magnetic yoke; a write gap layer formed between upper and lower poles of the magnetic yoke; and a write coil having a plurality of coil layers. Each coil layer extends continuously between the upper and the lower poles through a plane defined by the write gap layer. The write coil is preferably formed using a damascene process, where each coil layer has a larger width relative to each coil separating layer. Advantageously, the write coil structure has a reduced electrical resistance for reducing the Joule heating produced in the write coils. Further, either one or both of the lower and upper poles may include a horizontally laminated structure of alternating magnetic and non-magnetic dielectric layers to further reduce heating due to core losses originating from eddy current losses. The reduction of heating in the magnetic head leads to reduced protrusion.

Figure 13:
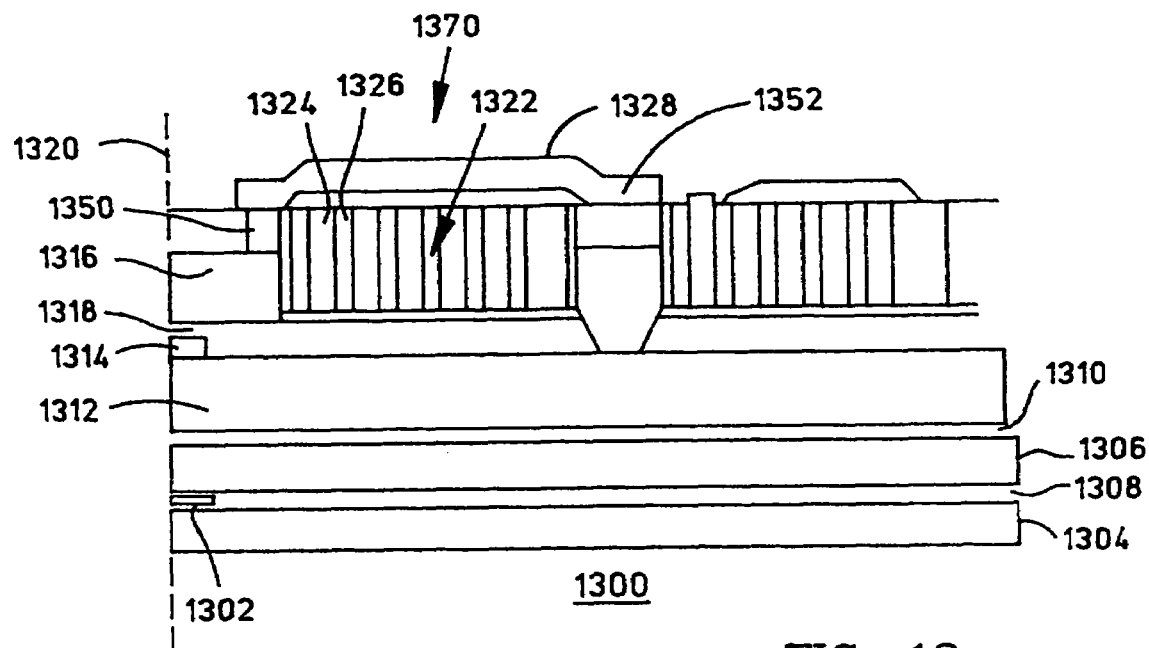
FIG. 13 is a partial elevation view of the slider and magnetic head in cross-section, wherein the magnetic head has another write coil structure of the present invention.

Turning now to FIG. 13, a partial cross-sectional view of a magnetic head 1300 in accordance with another embodiment of the present invention is shown. A read head portion of magnetic head 1300 includes a GMR sensor 1302 sandwiched in between first and second shield layers 1304 and 1306, being protected within surrounding insulator materials 1308. A write head portion of magnetic head 1300 includes a magnetic yoke 1370. Magnetic yoke 1370 is the "horseshoe" or similarly shaped magnetic body which has a lower magnetic pole and an upper magnetic pole. In the embodiment shown, the lower pole of magnetic yoke 1370 includes a first pole piece layer 1312 and a first pedestal structure 1314 and the upper pole of magnetic yoke 1370 includes a second pole piece 1316, a magnetic connecting pedestal 1350, and a third pole piece layer 1328 which serves as a magnetic connecting layer to the back gap region.

First pedestal structure 1314 includes at least one pedestal, which may be electroplated over first pole piece layer 1312 just behind an air bearing surface (ABS) 1320 of magnetic head 1300. A non-magnetic write gap layer 1318 separates the pole tips of the lower and the upper poles, being formed particularly between first pedestal structure 1314 and second pole piece 1316. Third pole piece layer 1328 has a front end formed on top of magnetic connecting pedestal 1350, which is formed on top of second pole piece 1316. Third pole piece layer 1328 has a back end formed on top of one or more magnetic connecting pedestals 1352 in the back gap region. The one of more magnetic connecting pedestals 1352 are formed on top of first pole piece layer 1312. A separation layer 1310 separates second shield layer 1306 from first pole piece layer 1312.

Magnetic yoke 1370 may be made with any suitable magnetic materials, preferably materials having a high magnetic moment, such as various compositions of NiFe alloys, CoFe alloys, or FeAlN, with the inclusion of other common additives or dopants to control its material properties. Write gap layer 1318 and separation layer 1310 may be made of alumina ($Al_2O_3$) or other suitable non-magnetic or dielectric material.

During a write operation, magnetic write flux is produced across write gap layer 1318 at the pole tips of magnetic yoke 1370. Current is driven through write coils 1322 to generate this magnetic write flux, as is conventional. As a result, heat is generated by write coils 1322 and thermally transferred to surrounding magnetic head components. If nothing is done to reduce such heating, thermal expansion will undesirably cause outward protrusion of pole tip materials from the ABS 1320 and therefore the fly height will have to be increased to avoid heat-to-disk mechanical interaction.

According the present invention, write coils 1322 of magnetic head 1300 are formed with a structure that reduces its electrical resistance to thereby reduce heating. This, in turn, reduces or eliminates protrusion of the head elements at the ABS 1320.

As shown in FIG. 13, write coils 1322 are formed with a plurality of coil layers, such as a write coil layer 1324. Each coil layer 1324 of write coils 1322 is made with a suitable electrically conductive material, such as copper (Cu). Other materials may be suitable, such as gold, silver, and aluminum. In between each coil layer 1324 is a plurality of dielectric coil separating layers, such as a coil separating layer 1326, which may be made from hard-baked photoresist, alumina ($Al_2O_3$), silicon-dioxide ($SiO_2$), or other suitable material.

As shown, each coil layer 1324 extends continuously between write gap layer 1318 and the upper pole of magnetic yoke 1370. One end of each coil layer 1324 is in close proximity to a top of write gap layer 1318, being separated only by a thin insulative layer. The other end of each coil layer 1324 is in close proximity to a bottom of third pole piece layer 1328 and is also separated by an insulator. It is noted that, in this embodiment, no coil layer 1324 extends between the lower pole and write gap layer 1318.

As apparent, each coil layer 1324 of write coils 1322 is taller in height than those of conventional write coils. Magnetic connecting pedestals 1350 and 1352 help to extend the height of each coil layer 1324. With such construction, write coils 1322 utilize a relatively large amount of electrically conductive materials (e.g. copper) as compared to that used in conventional write coils. An increase in the volume of conductive materials in write coils 1322 leads to a decrease in the electrical resistance of write coils 1322. A reduction in the electrical resistance of write coils 1322 leads to a reduction of heat generation during the write process which, in turn, leads to a reduction in protrusion of magnetic head 1300.

The height (i.e. top to bottom) of each coil layer 1324 may be formed between about 2.0–7.0 micrometers ($\mu m$). In the present embodiment, the height of each coil layer 1324 is about 4 $\mu m$. It is noted that, although maximum benefits are provided where each coil layer 1324 extends between magnetic yoke 1370 from top to bottom to the fullest practical extent, sufficient benefits may be achieved with a reduced height of one or both ends of each coil layer 1324.

As shown in FIG. 13, write coils 1322 are provided with six (6) coil turns. However, any suitable number of coil turns may be provided. For example, write coils 1322 may preferably have between about 1–20 coil turns. For lower resistance coils, the width of coil layer 1324 should be maximized while the width of coil separating layer 1326 should be minimized. Using conventional coil fabrication processes, however, each coil separating layer 1326 can only be formed with a width of between 0.4–1.0 $\mu m$ (nominally, 0.5 $\mu m$ for a coil layer of 2 $\mu m$ in height). On the other hand, using techniques described herein, coil layer 1324 and coil separating layer 1326 are formed such that each coil separating layer 1326 can be made with a width of between about 0.2–0.3 $\mu m$ (i.e. less than 0.4 $\mu m$). This can be achieved using a damascene process. Note that the "coil pitch" is the summation of coil layer 1324 and coil separating layer 1326.

As previously stated, write coils 1322 have a reduced electrical resistance which is sufficient to reduce thermal protrusion in magnetic head 1300. Conventional write coil structures with 6–7 coil turns typically have resistances of between about 4–9 Ohms (i.e. about 0.5–1.5 Ohm per coil turn). Provided with the construction described above, write coils 1322 exhibited a relatively low electrical resistance of about 2–4 Ohms.

With 6–7 coil turns, this write coil structure provides about 0.3–0.5 Ohms per coil turn. More generally, write coils 1322 of the present invention may exhibit electrical resistances of about 1–3 Ohms. With 6–7 coil turns, such a write coil structure provides about 0.15–0.5 Ohms per coil turn. Advantageously, the structure can provide less than 0.5 Ohms per coil turn and less than 4 Ohms of total electrical resistance.

Write coils 1322 may be formed in accordance with one of a number of different suitable techniques, conventional or otherwise. Preferably, write coils 1322 are fabricated utilizing a damascene process to achieve a larger width of each coil layer 1324 relative to each coil separating layer 1326. In a damascene process, materials are formed (e.g. electroplated or vacuum-deposited) within openings which are previously formed by etching (e.g. a reactive ion etch or RIE), and excess material is removed by polishing (e.g. a chemical/mechanical polishing or CMP). The use of such a process allows the coil structures and the coil spaces to have a larger aspect ratio (AR) and a smaller coil separating space than write coils of the prior art.

Figure 14:
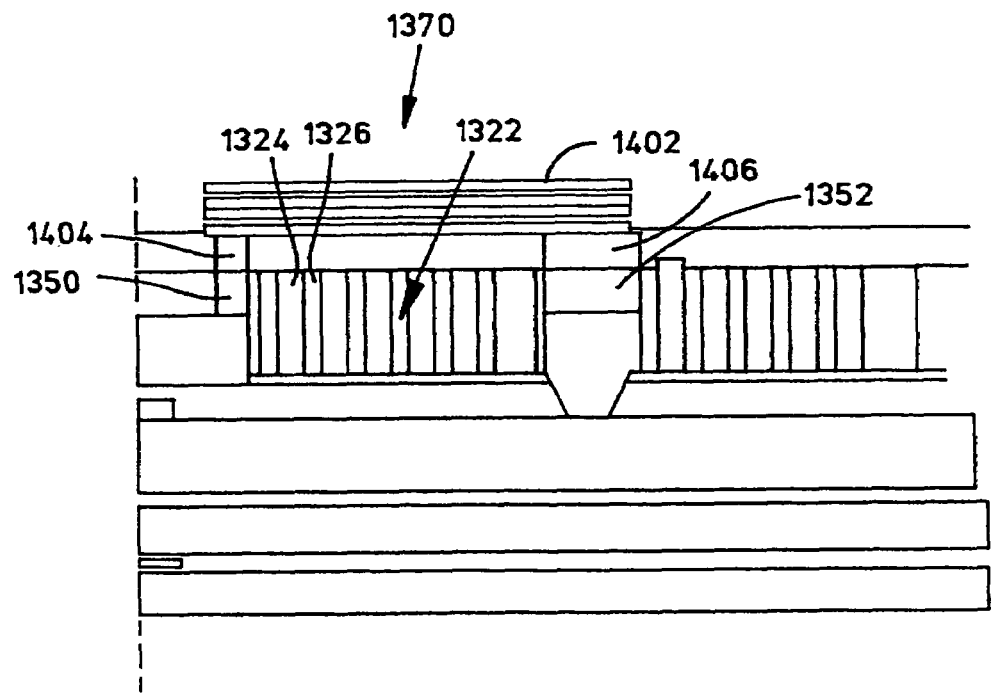
FIG. 14 is the structure shown and described in relation to FIG. 13 except that an upper pole piece of the magnetic yoke is made of alternating layers of magnetic and non-magnetic dielectric material.
Figure 15:
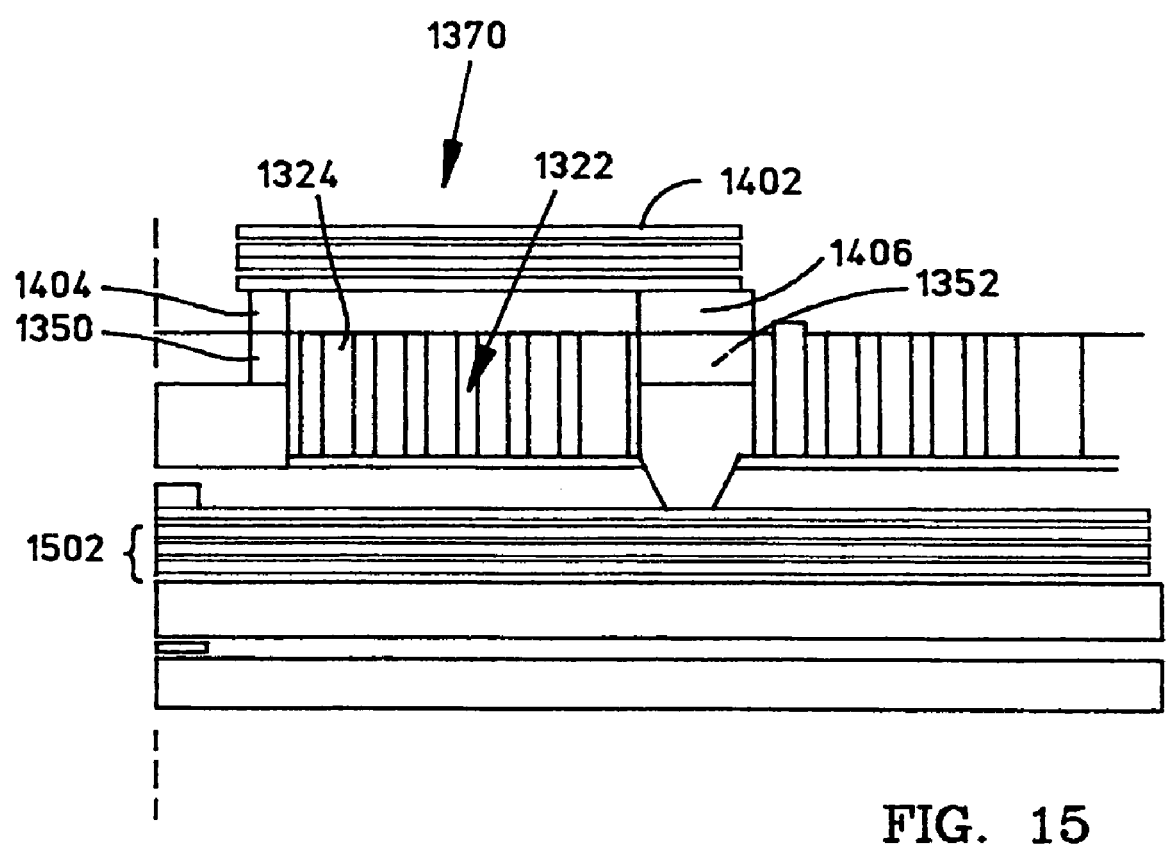
FIG. 15 is the structure shown and described in relation to FIG. 14, except that a lower pole piece of the magnetic yoke is also made of alternating layers of magnetic and non-magnetic dielectric material.

Another source of heat in magnetic head 1300 is generated by eddy current losses during write operation. To reduce such heating in magnetic head 1300, either one or both of the lower and upper poles includes a horizontally laminated structure of alternating magnetic and non-magnetic dielectric layers. Such a laminated structure helps to "break up" and reduce these eddy current losses. To illustrate, FIG. 14 is the same magnetic head shown in FIG. 13 except that the upper pole of magnetic yoke 1370 is made with a horizontally laminated structure 1402 of alternating magnetic and non-magnetic dielectric layers. Horizontally laminated structure 1402 may be formed on top of magnetic connecting pedestals 1404 and 1406, which are formed on top of magnetic connecting pedestals 1350 and 1352, respectively. FIG. 15 is the same magnetic head shown in FIG. 14 except that the lower pole of magnetic yoke 1370 (i.e. the first pole piece layer) is also made with a horizontally laminated structure 1502 of alternating magnetic and non-magnetic dielectric layers.

In FIGS. 14 and 15, each layer of the horizontally laminated structures 1402 and 1502 may be formed by vacuum-deposition and subsequent patterning by ion milling. Each magnetic layer may be made of the same magnetic materials previously described for magnetic yoke 1370, and each non-magnetic dielectric layer may be made of a suitable dielectric or non-magnetic material such as Alumina ($Al_2O_3$) or silicon-dioxide ($SiO_2$). Each magnetic layer may have a thickness of between about 50 and 2000 Angstroms and each non-magnetic dielectric layer may have a thickness of between about 10 and 200 Angstroms. In each horizontally-laminated structure, there may be a total of between 4 and 400 layers of magnetic/non-magnetic dielectric materials. Although shown in FIGS. 14 and 15 to terminate at about the height of second pole piece 1350, the top end of each coil layer 1324 may be further extended to be in close/closer proximity to the bottom of horizontally laminated structure 1402.

As apparent, the embodiments shown and described in relation to FIGS. 13–15 may be preferred over that of FIGS. 10–12 where the spacing between the read sensor and the write gap layer are to be minimized and left independent of the desired height of the write coils.

In even other embodiments, write coils 1322 and 1330 of FIGS. 13–15 are alternatively positioned in between write gap layer 1318 and the lower pole of magnetic yoke 1370 (e.g. the first pole piece 1312). Here, additional magnetic connecting pedestals 1350 and 1352 are not formed in the position shown in FIGS. 13–15, but rather are formed over first pole piece layer 1312. Thus, a magnetic head of the present invention may be constructed such that the above-described write coils are positioned in between write gap layer and either the lower pole or the upper pole of the magnetic yoke.

Thus, a magnetic head as described above includes a magnetic yoke; a write gap layer formed between upper and lower poles of the magnetic yoke; and a write coil having a plurality of coil layers. Each coil layer extends continuously between the write gap layer and either the lower pole or the upper pole of the magnetic yoke. The write coil is preferably formed using a damascene process, where each coil layer is wider than each coil separating layer. Advantageously, the write coil structure has a reduced electrical resistance for reducing the Joule heating produced in the write coils. Further, either one or both of the lower and upper poles may include a horizontally laminated structure of alternating magnetic and non-magnetic dielectric layers to further reduce heating due to core losses originating from eddy current losses. The reduction of heating in the magnetic head leads to reduced protrusion.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A magnetic head, comprising:
    a magnetic yoke;
    a write gap layer formed between upper and lower poles of the magnetic yoke;
    a pedestal formed above the lower pole;
    a pole piece formed below the upper pole;
    a damascene-constructed write coil having a plurality of coil layers;
    each coil layer of the damascene-constructed write coil extending continuously between the upper and the lower poles through a plane defined by the write gap layer; and
    each coil layer extending from a top of one of the pedestal and the pole piece; to at least half of a height of the other one of the pedestal and the pole piece.

2. The magnetic head of claim 1, wherein the write coil has an electrical resistance of less than 4 Ohms sufficient to reduce thermal protrusion at an air bearing surface (ABS) of the magnetic head.

3. The magnetic head of claim 1, wherein the write coil has an electrical resistance that is less than 0.5 Ohms per coil turn.

4. The magnetic head of claim 1, wherein each coil layer has a height between the upper and the lower poles that is 4 µm or greater.

5. The magnetic head of claim 1, wherein each coil separating layer is less than 0.4 µm.

6. The magnetic head of claim 1, wherein each coil layer extends from the top of the pole piece to the bottom of the pedestal.

7. The magnetic head of claim 1, further comprising:
    each coil layer further extending continuously to a fullest extent between the upper and lower and the lower poles.

8. The magnetic head of claim 1, wherein each coil layer comprises copper and at least one of the upper and lower poles further comprises:
    a pole piece layer over/under which the write coil is positioned;
    the pole piece layer comprising alternating layers of magnetic and non-magnetic dielectric material.

9. A magnetic recording device, comprising:
    at least one rotatable magnetic disk;
    a spindle supporting the at least one rotatable magnetic disk;
    a disk drive motor for rotating the at least one rotatable magnetic disk;
    a magnetic head for writing data from the at least one rotatable magnetic disk;
    a slider for supporting the magnetic head;
    the magnetic head including:
        a magnetic yoke;
        a write gap layer formed between upper and lower poles of the magnetic yoke;
        a pedestal formed above the lower pole;
        a pole piece formed below the upper pole;
        a damascene-constructed write coil having a plurality of coil layers;
        each coil layer of the damascene-constructed write coil extending continuously between the upper and the lower poles through a plane defined by the write gap layer; and
        each coil layer extending from a top of one of the pedestal and the pole piece; to at least half of a height of the other one of the pedestal and the pole piece.

10. The magnetic recording device of claim 9, wherein the write coil has an electrical resistance of less than 4 Ohms sufficient to reduce thermal protrusion at an air bearing surface (ABS) of the magnetic head.

11. The magnetic recording device of claim 9, wherein the write coil has an electrical resistance that is less than 0.5 Ohms per coil turn.

12. The magnetic recording device of claim 9, wherein each coil layer has a height between the upper and the lower poles that is 4 µm or greater.

13. The magnetic recording device of claim 9, wherein each coil separating layer is less than 0.4 µm.

14. The magnetic recording device of claim 9, wherein each coil layer extends from the top of the pole piece to the bottom of the pedestal.

15. The magnetic recording device of claim 9, further comprising:
    each coil layer further extending continuously to a fullest extent between the upper and the lower poles.

16. The magnetic recording device of claim 9, wherein at least one of the upper and lower poles further comprises:
    a pole piece layer over/under which the write coil is positioned;
    the pole piece layer comprising alternating layers of magnetic and non-magnetic dielectric material.

* * * * *

UNITED STATES PATENT AND TRADEMARK OFFICE
CERTIFICATE OF CORRECTION

PATENT NO. : 7,190,552 B2
APPLICATION NO. : 11/375160
DATED : March 13, 2007
INVENTOR(S) : Hsiao et al.

It is certified that error appears in the above-identified patent and that said Letters Patent is hereby corrected as shown below:

Column 11, Line 47, the semicolon ";" should be deleted.

Column 12, Line 29, the term "damascene-contrueted" should read --damascene-constructed--.

Column 12, Line 34, the semicolon ";" should be deleted.

Signed and Sealed this

Nineteenth Day of June, 2007

JON W. DUDAS
*Director of the United States Patent and Trademark Office*